United States Patent
Tormey

(10) Patent No.: US 6,694,209 B1
(45) Date of Patent: Feb. 17, 2004

(54) CELL FABRICATED AS AN IC WITH A REDESIGNED TRANSCEIVER PACKAGE WHICH CAN BE MULTIPLEXED TO DIFFERENT STATES WITHOUT USER INPUT

(75) Inventor: Milton T. Tormey, Los Altos, CA (US)

(73) Assignee: Echelon Corporation, San Jose, CA (US)

(*) Notice: Subject to any disclaimer, the term of this patent is extended or adjusted under 35 U.S.C. 154(b) by 763 days.

(21) Appl. No.: 09/603,788

(22) Filed: Jun. 26, 2000

(51) Int. Cl.⁷ .................. G06F 19/00; H04Q 11/00
(52) U.S. Cl. ............... 700/121; 370/360; 370/400; 307/125
(58) Field of Search ............... 700/121; 370/229–231, 370/315, 357–360, 400, 419–422; 307/112, 125; 375/211, 219, 220

(56) References Cited

U.S. PATENT DOCUMENTS

| | | | | |
|---|---|---|---|---|
| 4,918,690 A | * | 4/1990 | Markkula et al. | 370/400 |
| 4,979,183 A | * | 12/1990 | Cowart | 375/142 |
| 5,018,138 A | * | 5/1991 | Twitty et al. | 370/448 |
| 5,034,882 A | * | 7/1991 | Eisenhard et al. | 712/30 |
| 5,113,498 A | * | 5/1992 | Evan et al. | 710/8 |
| 5,148,144 A | * | 9/1992 | Sutterlin et al. | 340/310.01 |
| 5,519,878 A | * | 5/1996 | Dolin, Jr. | 709/220 |
| 5,548,614 A | * | 8/1996 | Stoll et al. | 375/211 |
| 5,844,888 A | * | 12/1998 | Markkula et al. | 370/255 |
| 5,942,814 A | * | 8/1999 | Sutterlin et al. | 307/125 |
| 6,172,984 B1 | * | 1/2001 | Beyda et al. | 370/448 |
| 6,222,853 B1 | * | 4/2001 | Marttinen et al. | 370/465 |
| 6,337,849 B1 | * | 1/2002 | Smith et al. | 370/230 |

* cited by examiner

Primary Examiner—Maria N. Von Buhr
(74) Attorney, Agent, or Firm—Blakely, Sokoloff, Taylor & Zafman LLP

(57) ABSTRACT

A circuit improvement which permits a cell fabricated as an integrated circuit and a transceiver package having a transceiver and transformer to be redesigned into a single integrated circuit without redesigning a printed circuit board is disclosed. A multiplexer within the cell controlled by a programming circuit provide either the original cell outputs or selected transceiver signals. The second package includes only the transformer. The cell thus appears to the user to look like the older cell when the MUX is in one state. The combination of the packages appear to a user to look like the old combination when the MUX is in its other state. The MUX is controlled by a programming circuit which may, for instance, be programmed with a high voltage or bond out option.

6 Claims, 1 Drawing Sheet

CELL FABRICATED AS AN IC WITH A REDESIGNED TRANSCEIVER PACKAGE WHICH CAN BE MULTIPLEXED TO DIFFERENT STATES WITHOUT USER INPUT

BACKGROUND OF THE INVENTION

1. Field of the Invention

The invention relates to the field of integrated circuits. More specifically, maintaining compatibility between circuit components when functions are moved from one circuit to another.

2. Prior Art

FIG. 1 illustrates two circuit elements. An integrated circuit, cell 10 and a circuit element 14 having an integrated circuit transceiver 11 and a transformer 12. Both circuit 10 and element 14 are typically mounted on a printed circuit board and are interconnected by traces on the board represented by the lines 15, 16 and 17. More specifically, the cell 10 in one embodiment is a "Neuron®" chip manufactured under license by Toshiba, part no. TMPN 3150/3120. This cell is also described in U.S. Pat. No. 4,918,690. Cells are used at nodes in a network having distributed intelligence and, for instance, receives inputs at one node to control an appliance at another node. For the configuration shown in FIG. 1, the cells are connected through circuit elements 19 in a network having a twisted pair line as the common link between the nodes. Input and output signals for control of devices are coupled over lines 18 including power for cell 10.

The transceiver 11 drives a signal onto and receives a signal from the twisted pair 19 through the transformer 12. Power for the embodiment of FIG. 1 is shown coupled to the circuit element 14. (In other embodiments power is obtained directly from the twisted pair 19 in the so-called "phantom fed" configuration.) The circuit element 14 is commercially available and is referred to as a flexible topography transceiver (FTT) from Echelon Corporation, FTT10A, model no. 50051.

At the time the cell 10 and transceiver 11 were initially designed it was cost effective to provide two separate integrated circuits. Now it is more economic to fabricate the transceiver 11 on the same substrate as the cell 10. However, if this is done existing circuit board designs made to accept the cell 10 and circuit element 14 may not be used. Moreover, in some instances the cell 10 is used without the transceiver 11 and it would appear that two separate parts are required to be stocked if the transceiver is fabricated as part of the cell.

As will be seen, the present invention allows the transceiver to be incorporated within the cell 10. This is done without any design changes to circuit boards and additionally, allows the newly configured cell to be used with and without the transceiver with the new cell having the same "footprint" as the earlier cell.

SUMMARY OF THE INVENTION

An improved combination of a cell and transceiver is described. An integrated circuit having a cell, a transceiver, a multiplexer and a programming circuit incorporated thereon is fabricated. The multiplexer is used to couple two output terminals of the integrated circuit either to a pair of lines from the transceiver or a pair of lines from the cell as a function of a stored state in the programming circuit. A second circuit element is used having a transformer. When the bit in the integrated circuit is set to one state the pair of terminals from the integrated circuits connects the transformer directly to the transceiver providing the same result as shown in FIG. 1.

DETAILED DESCRIPTION OF THE INVENTION

An improved combination of a cell and transceiver is described. In the following description, the invention is described in the context of a specific cell and transceiver. It will be apparent to one skilled in the art that the present invention may be practiced with other parts. Additionally, well-known circuits such as multiplexers and programming circuits have not been described in detail in order not to unnecessarily obscure the present invention.

Figure 1:
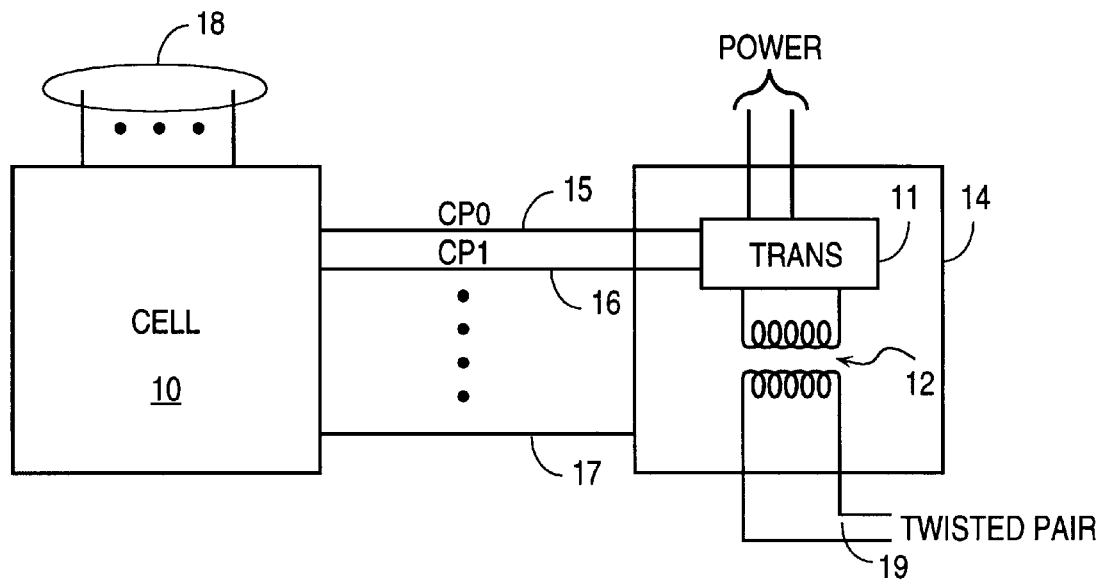
FIG. 1 is a block diagram showing a prior art cell and circuit element having a transceiver and transformer.
Figure 2:
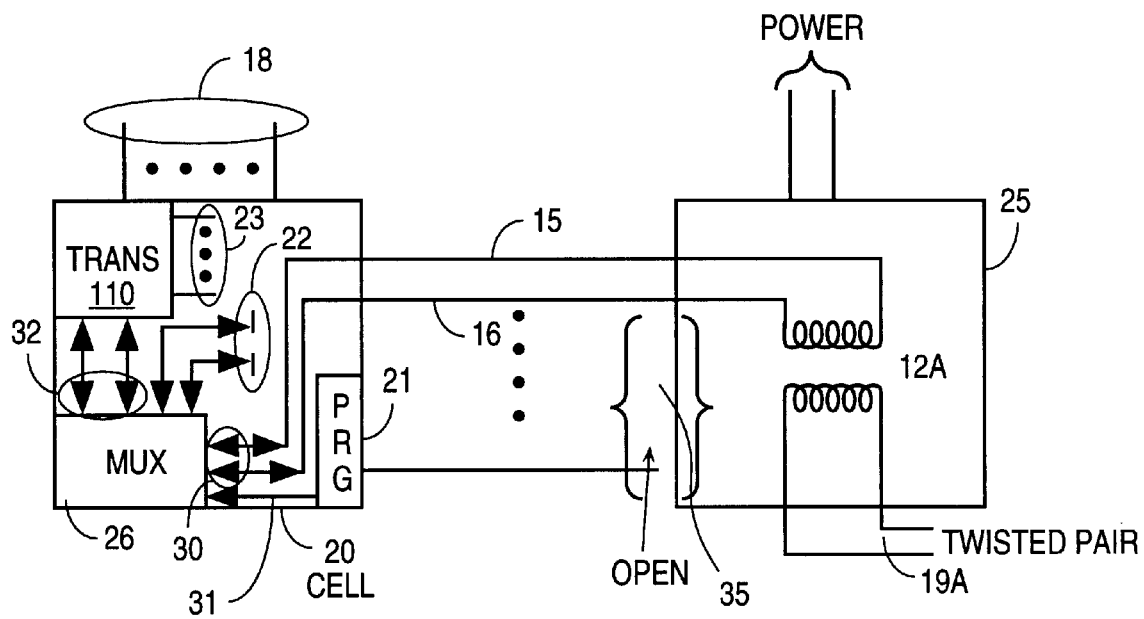
FIG. 2 is a block diagram showing the improvement of the present invention having an integrated circuit incorporating thereon a cell and transceiver and a second circuit element having a transformer.

Referring to FIG. 2, with the improvement of the present invention, the transceiver 11 of FIG. 1 is fabricated on the same integrated circuit substrate as the cell 10 of FIG. 1. This is shown in FIG. 2 as cell 20 which incorporates the transceiver 110 onto the integrated circuit containing the cell. This is economically viable since greater functionality can be included on the same size semiconductor die.

In the present invention, the cell 20 of FIG. 2 may operate exactly as the cell 10 of FIG. 1 or as the cell 10 and the transceiver 11 of FIG. 1. To facilitate this, a multiplexer 26 is integrated on the integrated circuit containing the cell and transceiver. Additionally, a programming circuit 21 is also integrated onto the cell 20.

The programming circuit in one embodiment is a non-volatile memory circuit intended to be programmed only once and to store a single bit. The state of this bit is coupled to the multiplexer 26 on line 31 and determines whether the output lines 30 of the multiplexer will be coupled to lines 22 or lines 32. In another embodiment, it is contemplated that the programming circuit 21 can be reprogrammed although this is not the currently preferred embodiment.

In one embodiment the programming circuit 21 does not require any additional pins or terminals on the cell 10. Rather, one of the existing terminals is used for programming or reprogramming the circuit 21. To this end, the programming circuit may be programmed by the application of a higher than normal operating potential to one or more of the terminals simply for the purpose of programming the stored state in circuit 21. Such use of a higher-than-normal operating voltage for programming is known in the art. The circuit 21 in another embodiment may also be programmed by using a predetermined combination of signals on the terminals which would not occur in normal use of the cell 20. Logic circuits within the cell detect this combination and it used to program the circuit 21. In still another embodiment, the circuit 21 could also be programmed through use of a mask during the fabrication of the integrated circuit or during its packaging by a bond out option which would, for instance, connect an internal node of the integrated circuit to either ground or Vcc to select the program state within the circuit 21.

Since it is an object of the present invention to permit the cell 10 of FIG. 1 to be replaced with the cell 20 of FIG. 2 and likewise to permit the circuit element 14 of FIG. 1 to be replaced with the circuit element 25 of FIG. 2, the packages for cells 10 and 20 are the same and similarly the packages for element 14 and element 25 are the same. While the packages are the same, it is contemplated that for the element 25 some of the printed circuit board leads will not necessary make electrical contact within the element 25. That is, for instance, pins could be missing from element 25 or if electrical contact is provided to the element 25 the terminals of the package go nowhere in the element 25, that is, they are open. This is shown in FIG. 2 by the open lines 35. These open lines are connected at their other end to the terminals on the cell and these terminals provide useful signals when the transceiver 110 is not being used.

If the cell of FIG. 2 is to be used as a replacement for the cell 10 of FIG. 1, the program circuit 21 is programmed so that the MUX 26 selects the lines 22 for coupling to the output terminals. This assures that the correct cell signals are at the terminals and prevents any of the outputs from the transceiver 110 from being coupled to the output terminals of cell 20. In effect, the transceiver 110 is disabled. Power for the transceiver 110 may also be coupled through another line of the MUX to reduce power consumption of the cell 20 when the transceiver is not in use. The cell 20 appears to the circuit in which it is installed as being identical to the cell 10 of FIG. 1 when the transceiver is not selected.

On the other hand, if the cell 20 of FIG. 2 is to be used for coupling to the twisted pair 19 shown in FIG. 1, then the programming circuit 21 is programmed such that the multiplexer 26 selects lines 32 for coupling to the lines 15 and 16. In this case, the lines 23 receive the signals interconnecting the cell and transceiver 11 of FIG. 1 (CP0 and CP1). The other signals coupled over the lines shown between lines 16 and 17 of FIG. 1 are coupled to the transceiver 110 internally to the cell 20.

In FIG. 2 the circuit element 14 of FIG. 1 is replaced as mentioned by the circuit element 25 of FIG. 2. This package in one embodiment only includes the transformer of FIG. 1 shown as transformer 12A in FIG. 2. The transformer is coupled to the terminals receiving the lines 15 and 16 and provides a coupling to the twisted pair shown as lines 19A in FIG. 2. These are the same terminals used for the twisted pair 19 of FIG. 1. To a user, when the transceiver 110 of FIG. 2 is in use, the combination of the cell 20 and the circuit element 25 appear identical to the cell 10 and circuit element 14 of FIG. 1. Note no redesigning of the circuit board on which components are mounted need be made. Some of the leads that interconnect the cell 20 and circuit element 25 of FIG. 2, as mentioned above, are not in use as shown by the open circuits 35. However, this is not apparent to a user and does not affect the operation of the combination of FIG. 2.

Thus, through use of the programming circuit and multiplexer 26 of FIG. 2 it is possible to replace the cell 10 and circuit element 14 of FIG. 1 with the cell 20 and element 25 of FIG. 2. There is the advantage that the transceiver 11 of FIG. 1 is now fabricated on the same integrated circuit as the cell 10 of FIG. 1. Note, only a single integrated circuit need be fabricated for two separate parts, one being the cell alone and the other the cell with transceiver of FIG. 2.

In the above discussion it is assumed that the circuit element 14 of FIG. 1 receives power on two separate leads and that when used in the embodiment of FIG. 2 these leads are open. In some embodiments, the element 14 of FIG. 1 includes a power supply which obtains power from the twisted pair 19. The power from this twisted pair may be then coupled to operate the cell 10. The advantage of the present invention is obtained in this embodiment. The power supply simply remains within the element 25 and may be used to provide power to the cell 20.

Thus, an improved cell is disclosed which incorporates a transceiver while retaining compatibility with earlier versions of the cell.

What is claimed is:

1. An improved combination of a cell and a transceiver comprising:

an integrated circuit having a cell, a transceiver, a multiplexer and a programming circuit incorporated thereon, the multiplexer coupling to output terminals of the integrated circuit either a pair of lines from the transceiver or a pair of lines from the cell as a function of a stored state in the programming circuit; and a circuit element incorporated in a second package having a transformer for coupling to the output terminals of the integrated circuit, the transformer for receiving the pair of lines from the transceiver when the stored state is in a first state.

2. The improved combination of a cell and transceiver defined by claim 1 wherein when the stored state is a second state the output terminals are coupled to the pair of lines from the cell.

3. The improved combination of a cell and transceiver defined by claim 1 wherein the programming circuit is programmed through using a higher potential than the operating potential used to operate the cell.

4. The improved combination of a cell and transceiver defined by claim 1 wherein the programming circuit is programmed by a predetermined combination of signals on input lines to the integrated circuit.

5. The improved combination of a cell and transceiver defined by claim 1 wherein the programming circuit is programmed during fabrication with a mask.

6. The improved combination of a cell and transceiver defined by claim 1 wherein the programming circuit is programmed through a bonding option.

* * * * *